(12) United States Patent
Rahmstorf et al.

(10) Patent No.: US 6,302,472 B1
(45) Date of Patent: Oct. 16, 2001

(54) VEHICLE DOOR

(75) Inventors: Peter Rahmstorf, Saint Laurent du Pont Frankreich; Lydia Creutz, Ingwiller, both of (FR)

(73) Assignee: Sommer Allibert-Lignotock GmbH (DE)

(*) Notice: Subject to any disclaimer, the term of this patent is extended or adjusted under 35 U.S.C. 154(b) by 0 days.

(21) Appl. No.: 09/600,423

(22) PCT Filed: Dec. 8, 1998

(86) PCT No.: PCT/EP98/07912

§ 371 Date: Jul. 13, 2000

§ 102(e) Date: Jul. 13, 2000

(87) PCT Pub. No.: WO99/36281

PCT Pub. Date: Jul. 22, 1999

(30) Foreign Application Priority Data

Jan. 13, 1998 (DE) ............................................. 198 01 842

(51) Int. Cl.⁷ .................................................. B62D 25/04
(52) U.S. Cl. ...................................... 296/146.5; 296/146.6; 296/188; 49/501; 49/502
(58) Field of Search ..................................... 296/188, 189, 296/146.5, 146.6, 191, 76, 50; 49/501, 502

(56) References Cited

U.S. PATENT DOCUMENTS

| | | | |
|---|---|---|---|
| 3,385,002 | * | 5/1968 | Quinif .................................. 49/501 |
| 3,868,796 | * | 3/1975 | Bush ................................. 296/146 X |
| 5,040,335 | * | 8/1991 | Grimes ................................. 49/502 |
| 5,056,264 | * | 10/1991 | Jewell, II et al. ..................... 49/502 |
| 5,482,343 | | 1/1996 | Bradac . |
| 5,536,060 | | 7/1996 | Rashid et al. ....................... 296/146.6 |
| 5,548,930 | * | 8/1996 | Morando ............................... 49/502 |
| 5,909,937 | * | 6/1999 | Jerkins et al. ..................... 49/501 X |
| 5,913,996 | * | 6/1999 | Ikegame et al. ..................... 156/212 |

FOREIGN PATENT DOCUMENTS

| | | |
|---|---|---|
| 39 34 590 A | 4/1991 | (DE) . |
| 295 07 235 U | 7/1995 | (DE) . |
| 195 11 105 C | 11/1996 | (DE) . |
| 2 569 146 A | 2/1986 | (FR) . |

* cited by examiner

Primary Examiner—Joseph D. Pape
Assistant Examiner—Lori L. Coletta
(74) Attorney, Agent, or Firm—Young & Basile, P.C.

(57) ABSTRACT

The invention relates to a vehicle door which, in a known manner, is comprised of a door outer panel (5), a door inner panel (1), a movable window pane (12), a module support (4) having accompanying functional elements, and an inner lining (3). The module support and the functional elements supported by the module support are located in the interior door space formed between the door inner panel and the inner lining.

15 Claims, 3 Drawing Sheets

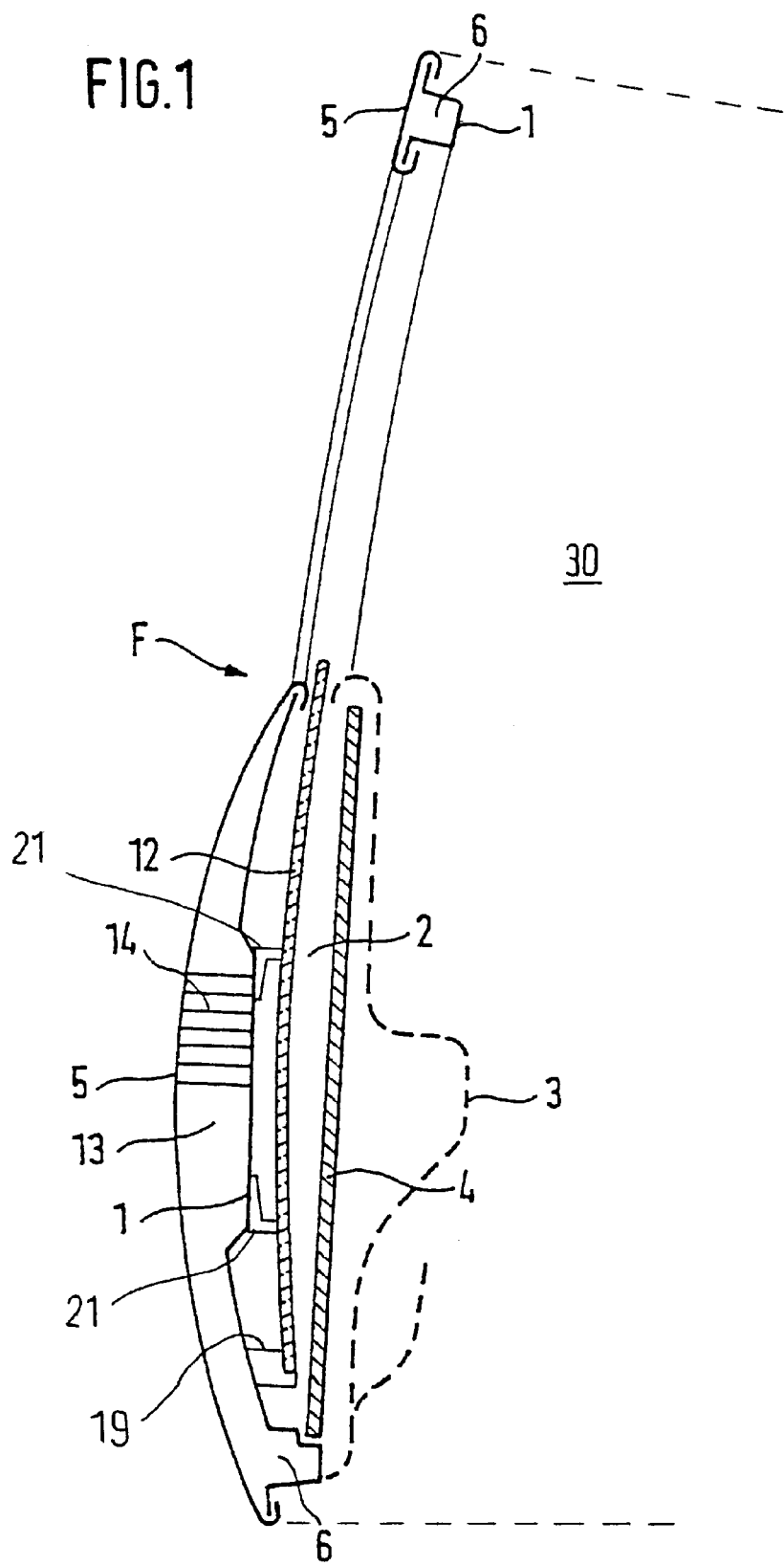

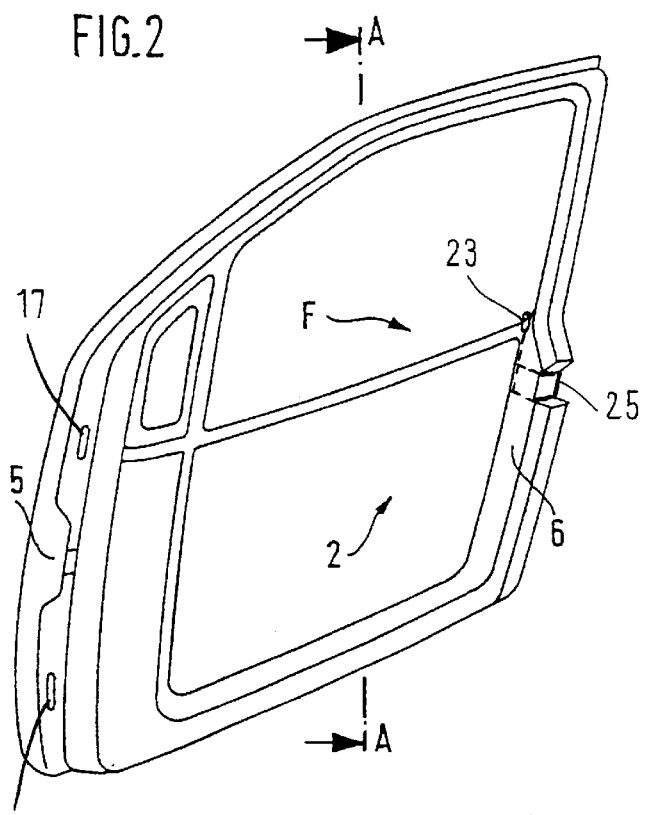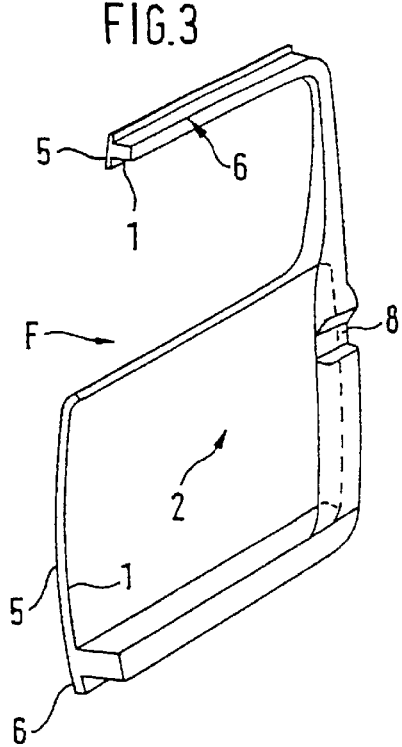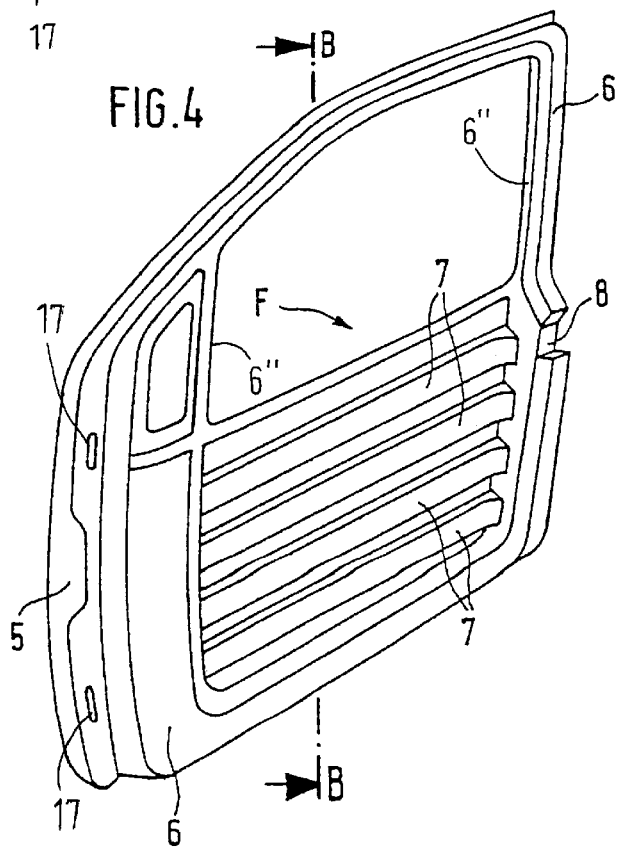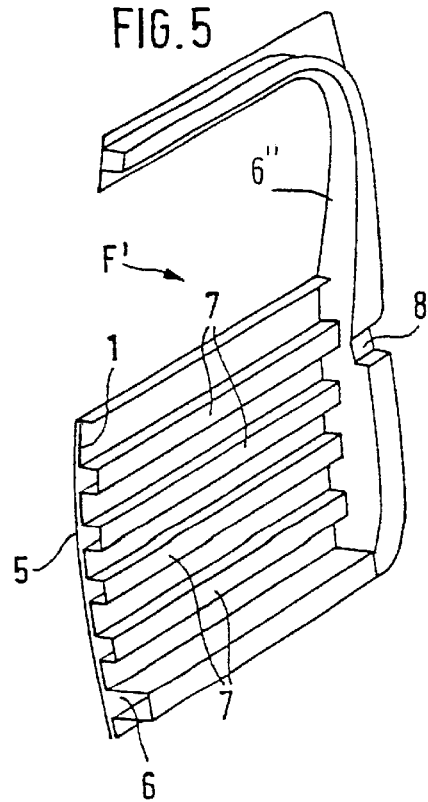

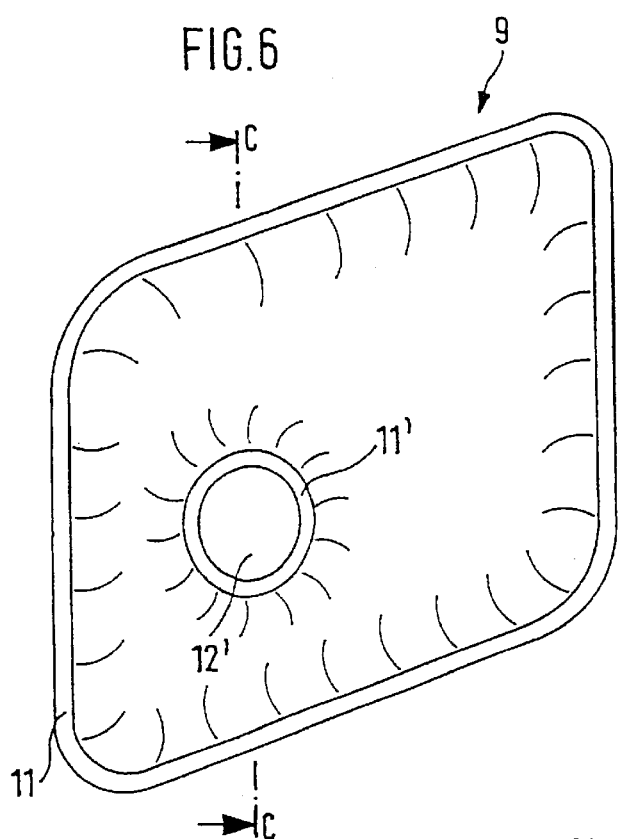
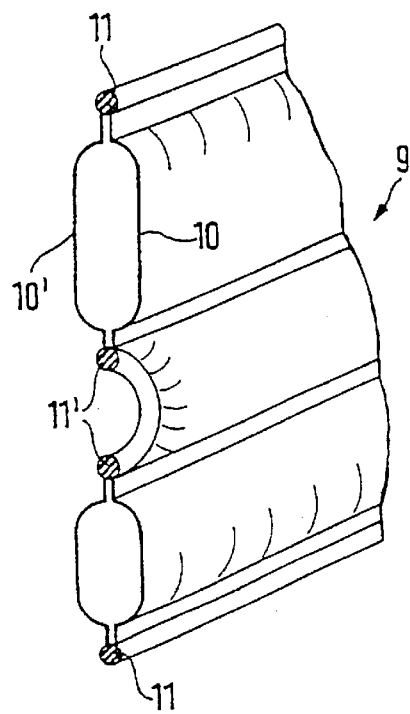
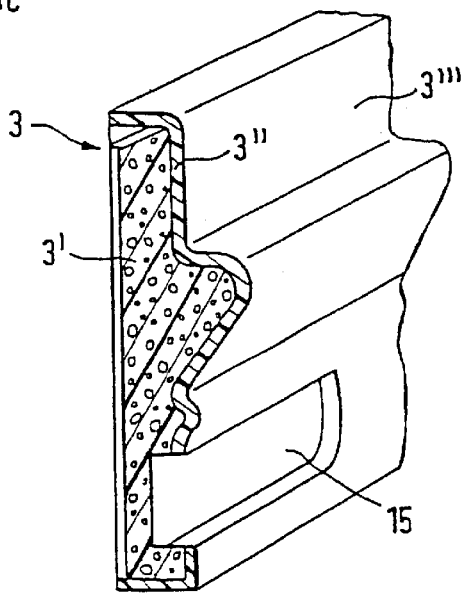
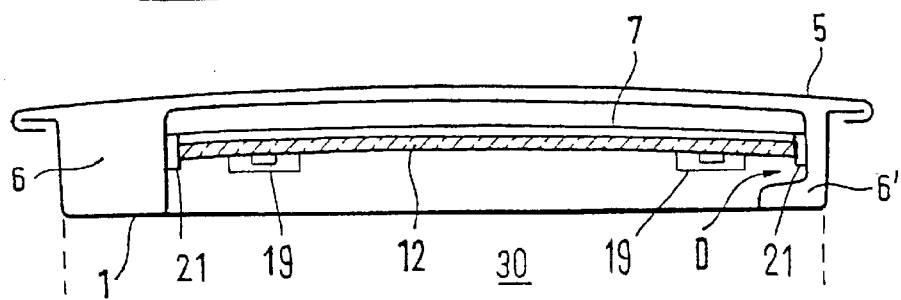

VEHICLE DOOR

BACKGROUND OF THE INVENTION

The invention relates to a vehicle door.

Vehicle doors, especially doors for motor vehicles, consist in the current state of the art of an inner panel and an outer panel, these two being connected to one another and forming the basic element of the door. It is completed by the generally moveable window pane, its guiding and actuating elements, by other functional elements, such as for example handles, locks, loud speaker and cable harnesses, nowadays generally mounted on a module support plate, and by an inner lining which determines the appearance of the interior of the vehicle. The door inner and outer panels are here arched in opposite directions inside the vehicle door and enclose the interior door space, which receives window pane and functional elements. The door inner panel here has mounting apertures or cutouts, which make possible the fitting of the functional elements. As representative of the state of the art, DE 295 07 235 and DE 195 11 105 C1 may be mentioned which explain in detail the state of the art, from which the invention proceeds.

The known arrangement of door outer panel and door inner panel is admittedly. a satisfactory solution in respect of the statics of the door, but it does have a number of disadvantages:

the assembly of the functional elements through the cutouts in the door inner panel requires swivelling, rotating and tipping movements, which make assembly more difficult, particularly if the functional elements are pre-mounted on module supports and the module support has to be "threaded in" as a whole.

In relation to a lateral impact, the door box is "soft"; however increasing attention is being give to the "side crash". In the state of the art, the behaviour of doors in a side crash is improved by additionally fitted reinforcement profiles, which represents additional expenditure.

Finally, the predetermination of assembly cutouts restricts the possibilities of the free equipment of the interior. Equipment variants, with which a uniform door having door inner and outer panels can be fitted in as varied a way as possible, will however be increasingly desired in the future by manufacturers and buyers.

SUMMARY OF THE INVENTION

The purpose of the invention, therefore, is to quote a vehicle door in which simple assembly of the functional elements is possible, above all when these are premounted on module supports, the behaviour of the door in a side crash is improved without needing additional elements, and more degrees of freedom for the inner equipment of the vehicle are obtained.

Because the module support and the functional elements supported by same are located in the interior door space formed between door inner panel and inner lining, the door inner panel does not need to have any mounting apertures since the interior door space, which receives the functional elements, is completely accessible for their mounting, even if they are pre-assembled on a module support. Also, the functional elements, module supports and inner linings disposed in the interior door space or adjoining same are not subject to any restrictions in respect of a design variant. If then the door outer panel and the door inner panel still form a peripheral stiffening box, and the door inner panel, inside the area bordered by this stiffening box, abuts against the door outer panel, at least in regions, the stability of the door system is ensured in the same way as with door systems according to prior art. There is then the advantageous possibility of so designing the door inner panel that it forms together with the door outer panel in addition at least one (preferably several) horizontally running box profile(s) which form with the peripheral box profile a static unit and thus strengthen the door against a side crash without additional structural parts.

In the region of the lock, the peripheral stiffening box can be realised flattened and thus make it possible for the lock not to be pushed through but placed on same, which in particular makes easier the mounting of a lock attached to a module support.

Particularly in the region of the B-column, i.e. where on the front door the door lock engages in the corresponding vehicle body strut, it can be advantageous if the door inner panel (and thus the stiffening box) is designed undercut, such that the moveable window pane can be realised wider, i.e. with a larger field of vision.

The undercutting makes it possible to provide adequate pane areas, without the stability, predetermined by the stiffening box, of the door system being reduced, sincean adequate width of the stiffening box can be realised.

Where the hinges are attached, the door inner panel can be reinforced, specifically inside the stiffening box, i.e. not visible after the connection of door outer and inner panels. If necessary, subsequent (i.e. individual) fitting of the door to the vehicle body is possible, for example if the door is delivered to the assembly line as a complete pre-assembled system.

Inner and outer panels are expediently connected at their outer edge by folding of the outer panel. In the regions below the window breast, in which the door inner panel abuts against the door outer panel, the panels can be interconnected by spot or seam welding however it is particularly advantageous if they are interconnected here by flat gluing. The layer of adhesive not only dampens natural oscillations of the panels and thus improves the acoustics in the vehicle, but it also makes it possible to connect non-metallic materials to one another. In this way it becomes possible to insert door outer or inner panels which have a hybrid structure, i.e. which consist of a metal/plastics composition. Thus it is possible for example, to integrate in the lower region of the door outer panel a protection against stones which is formed from polymeric materials. The moulded polymer regions can here have stiffening rib networks which engage in the approximately horizontal stiffening profiles of the door inner panel and improve the inherent rigidity of the door and thus its security against a side crash.

If single- or double-stranded cable-operated lifting devices are used for the window pane movement, the free accessibility of the interior door space makes it possible for the cable-operated lifting device together with guide rails for the panes to be fastened to the module support: an arrangement which is admittedly also usual in the state of the art, but in which the free accessibility of the interior door space simplifies assembly (it can be undertaken with the pane inserted) and allows a complete functional testing of the fitted module support. On simple equipment variants, however, it is also possible to attach the guiding elements of the cable-operated lifting device directly to the door inner panel, such that the pane is disposed in front of the cable-operated lifting device, when viewed from the vehicle interior. In this case, it is also possible to let the pane slide as on a cable-operated lifting device on two separate guide rails, which are attached directly to the door inner panel, but to have the lifting movement of the pane carried out by sheers disposed on the module support. In this arrangement, the advantages of both systems are combined: the pane is led exactly in the interior door space and cannot tip; on the other hand the lifting movement is carried out with the operationally reliable sheers. Between the module support with assembled functional elements and the pane (with the guiding elements of the lifting device), a peripherally sealed flat humidity barrier can be disposed, for example a reusable moulded shell in the form of a thermoplastic thermoformed part. But even single-use foils (for example shrink films) can be used. It is particularly advantageous if the humidity barrier is an airbag formed from foils and which is inflatable after assembly of the module support. It forms then on the one hand the flat humidity barrier with peripheral seal, on the other hand it acts in the event of a side crash as an additional dampening element. It is here possible to optimise the damping characteristic by drain valves through which the air can escape in a choked manner in the event of a crash. However it is also possible to couple these side paddings with an airbag system, for example via a common gas generator with a sensor release. A flat airbag of this kind does not however have to be disposed in every case as a humidity barrier between module support and interior door space; it can exercise its protective function also between module support and inner lining, above all if the inner lining is configured predominantly as a thin shell, for example as a thermoplastic injection moulded part or as a wood-fibre moulding.

An advantageous design of the inner lining can consist in its having the following layer structure (from the interior door space towards the vehicle interior); to a voluminous support part made of blown polypropylene beads, is attached a thin padding layer formed from polyurethane foam (flexible foam) which is covered on the visible side by a decorative layer formed from films, fabrics or leather. A structured inner lining of this type has manifold advantages:

it is light and has good acoustic and mechanical damping properties

When a uniform support part is used, a different inner contour can be realised by varying the flexible foam layer.

Reinforcing elements and/or attachment support points can be also foamed into the support part, with the aid of which, for example, equipped module supports can be combined with the support part to form a compact subassembly, in order to make compact assembly possible, possibly with the inclusion of the humidity barriers.

BRIEF DESCRIPTION OF THE DRAWINGS

The invention will now be explained and described in greater detail with the aid of FIGS. 1 to 9. They show.

FIG. 1 a schematic section through a door according to the invention,

FIG. 2 a perspective view of the basic element, formed from door inner and outer panels, of a door according to the invention, in which the door inner panel and door outer panel lie flat against one another, FIG. 3 section A—A according to FIG. 2 in an identical view, FIG. 4 also in perspective view, the basic element of the door, formed from door inner and outer panels, with a plurality of stiffening boxes running horizontally, FIG. 5 in identical view, section B—B according to FIG. 4, FIG. 6 a flat humidity barrier in the form of an inflatable damping element, FIG. 7 section C—C according to FIG. 6, FIG. 8 a sectional view of a region of an inner lining part, and FIG. 9 a schematic, horizontal section through a door with undercut stiffening frame.

DETAILED DESCRIPTION OF THE PREFERRED EMBODIMENT

In FIG. 1, the door inner panel is referred to as 1 and the door outer panel as 5. 4 refers to the module support which, together with the door inner panel 1, surrounds the door interior space 2, which receives the functional elements of the door (the functional elements such as window lifting device, window guides, lock and lock actuation are not represented on account of clarity). The door inner panel 1 forms with the door outer panel 5 the peripheral stiffening box 6. Between door inner panel 1 and door outer panel 5 is located, in the embodiment shown in FIG. 1, the intermediate space 13 which can be provided with a damping and/or energy-absorbing filler or which receives shock-absorbing elements 14. The intermediate space 13 can, for example, be filled with foam in order to improve the acoustic behaviour of the vehicle body; the behaviour in the event of a side crash could be optimised by a deformable honeycomb construction. A window pane 12 can here be guided on the side towards the door inner panel 1 or also sideways towards the module support 4 (not represented). The contour of an inner lining 3 is represented in broken lines.

If single- or double-stranded cable-operated window lifting devices 19 are used for the window pane 12 movement, the free accessibility of the interior door space makes it possible for the cable-operated window lifting device 19 together with guide rails 21 for the panes to be fastened to the module support: an arrangement which is admittedly also usual in the state of the art, but in which the free accessibility of the interior door space simplifies assembly (it can be undertaken with the pane inserted) and allows a complete functional testing of the fitted module support. On simple equipment variants, however, it is also possible to attach the guiding elements of the cable-operated window lifting device 19 directly to the door inner panel 1, such that the pane 12 is disposed in front of the cable-operated window lifting device 19, when viewed from the vehicle interior 30. In this case, it is also possible to let the pane 12 slide as on a cable-operated window lifting device 19 on two separate guide rails 21, which are attached directly to the door inner panel 1, but to have the lifting movement of the pane 12 carried out by sheers disposed on the module support 4. In this arrangement, the advantages of both systems are combined: the pane 12 is led exactly in the interior door space and cannot tip; on the other hand the window lifting movement is carried out with the operationally reliable sheers. Between the module support 4 with assembled functional elements and the panel 2 (with the guiding elements of the lifting device), a peripherally sealed flat humidity barrier 9 can be disposed, for example a reusable moulded shell in the form of a thermoplastic thermoformed part. But even single-use foils 10 and 10' (for example shrink films) can be used. It is particularly advantageous if the humidity barrier is an airbag 9 formed from foils 10 and 10' and which is inflatable after assembly of the module support 4. It forms then on the one hand the flat humidity barrier 9 with peripheral seal 11 and 11', on the other hand it acts in the event of a side crash as an additional dampening element. It is here possible to optimise the damping characteristic by drain valves through which the air can escape in a choked manner in the event of a crash. However it is also possible to couple these side paddings with an airbag system, for example via a common gas generator with a sensor release. A flat airbag 9 of this kind does not however have to be disposed in every case as a humidity barrier between module support 4 and interior door space; it can exercise its protective function also between module support 4 and inner lining 3, above all if the inner lining 3 is configured predominantly as a thin shell, for example as a thermoplastic injection moulded part or as a wood-fibre moulding.

From FIG. 2 can be seen the door outer panel 5 and the openly accessible interior door space 2. The stiffening box 6 borders the whole door, it predetermines with its depth the door interior space 2. The breast of the window cut-out is referred to as F.

In the region of the lock 23 and lock activation 25, the peripheral stiffening box 6 can be realized flattened and thus make it possible for the lock 23 not to be pushed through but placed on same, which in particular makes easier the mounting of a lock 23 and a lock activation 25 attached to a module support.

More clearly than in the overall view of FIG. 2, it can be seen from FIG. 3 that the basic element of the door according to the invention is composed of the door inner panel 1 and the door outer panel 5. The course and the cross-sectional shape of the stiffening box 6 are here easily recognisable with the aid of section A—A. Where the hinges 17 are attached, the door inner panel 1 can be reinforced, specifically inside the stiffening box 6, i.e. not visible after the connection of door outer and inner panels 5 and 1, respectively. If necessary, subsequent (i.e. individual) fitting of the door to the vehicle body is possible, for example if the door is delivered to the assembly line as a complete pre-assembled system.

Like FIG. 2, FIG. 4 shows the basic element of the door in perspective view, this time however in the example of a door with side reinforcement. The horizontally running box-shaped stiffening profiles 7 are here predetermined by the shaping of the door inner panel 1. Shape and course of the stiffening profiles 7 are represented for example in FIG. 4; for both, however, there is extensive freedom of design, for example stiffening profile networks are also possible. The peripheral stiffening box 6 which gives the door torsional strength, is preserved. The stiffening profiles 7 are directly connected to the peripheral stiffening box 6 and form a static overall system which provides the basic element of the door with particularly good rigidity behaviour and good safety properties in the event of a side crash. In region 8, the stiffening box 6 is designed flattened to receive the door lock 23 and 25.

FIG. 5 makes clear with the aid of section B—B the shaping of the door inner panel 1. The stiffening profiles 7 are designed flatter than the stiffening box 6 such that sufficient interior door space remains for the functional elements.

FIG. 6 shows a flat humidity barrier in the form of an airbag 9, in front elevation.

FIG. 7 explains details of same with the aid of section C—C in FIG. 6. Foils 10 and 10', welded to one another, form the flat inflatable airbag 9 (the valve is not shown), which covers the door interior space 2 as a humidity barrier, and which has a peripheral seal 11. An aperture 12' permits the window lifting device to grip through to the pane. The aperture 12' is also provided with a peripheral seal 11', which prevents the passage of humidity.

FIG. 8 shows an advantageous embodiment of the door inner lining 3 facing the vehicle interior. A basic body, consisting of expanded polystyrene beads, i.e. the support part 3', pre-determines approximately the contour of the door system towards the passenger space. The support part 3' is covered with a flexible foam layer 3" which gives a decorative layer 3''' a pleasant "grip" (good haptics A hollow 15 for a map pocket which may be mounted thereon (not shown) is integrated into the support part 3'; it is naturally also possible to mould the complete map pocket in said part. The flexible foam layer 3" can, differently from what is shown in FIG. 8, be of varying thickness and thus make it possible to realise different interior variants with a uniform support part 3'. The decorative layer 3''' can as usual consist of foil, leather, fabric or, what is particularly advantageous, a slush skin.

FIG. 9 explains how the pane 12 can be widened by an undercut region D formed by a pair of vertical columns 6" of the peripheral stiffening box 6. Through the undercut region D is produced a cross-section 6' of the stiffening box 6 which corresponds approximately to a U-profile such that sufficient overall rigidity of the stiffening box 6 is preserved.

What is claimed is:

1. Vehicle door, consisting of a door outer panel, a door inner panel, a movable window pane, a module support with associated functional elements including at least one of a window lifting device, window guides, and a door lock and a lock activation, and an inner lining, characterised in that the module support and the functional elements are located in an interior door space formed between the door inner panel and inner lining, wherein the door outer panel and the door inner panel form a peripheral stiffening box and at least a portion of the door inner panel abuts against the door outer panel within the peripheral stiffening box and wherein the door outer panel and the door inner panel enclose at least one box-shaped, approximately horizontally running stiffening profile connected to the peripheral stiffening box and forming a static overall system, wherein the peripheral stiffening box is flattened at least in the region of the door lock, and wherein the stiffening box has a region of at least two adjoining and approximately vertical columns forming an undercut region in which the window pane is moveable.

2. Door according to claim 1, wherein the door inner panel is reinforced in a hinge region located inside the stiffening box.

3. Door according to claim 1, wherein the door outer panel and the door inner panel are connected to one another flat by gluing.

4. Door according to claim 1, wherein at least one of the door outer panel and the door inner panel consist at least partially of non-metallic materials.

5. Door according to claim 3, wherein at least one of the door outer panel and the door inner panel has a stiffening profile which can be received by the stiffening box.

6. Door according to claim 1, wherein the window lifting device has at least a single-stranded cable for the window pane movement and is attached to the module support, and the window pane is disposed behind the window lifting device, when viewed from the vehicle interior.

7. Door according to claim 1 wherein the window lifting device operated by at least a single-stranded cable for the window pane movement and is fastened to the door inner panel and the window pane is disposed in front of the window lifting device, when viewed from the vehicle interior.

8. Vehicle door, consisting of a door outer panel, a door inner panel, a moveable window pane, a module support with associated functional elements including at least one of a window lifting device, window guides, and a door lock and a lock activation, and an inner lining, characterised in that the module support and the functional elements supported thereby are located in an interior door space formed between the door inner panel and the inner lining wherein a flat peripherally sealed humidity barrier is disposed between the functional elements mounted on the module support and the window pane with the window lifting devices.

9. Door according to claim 8, wherein the humidity barrier is a reusable molded shell.

10. Door according to claim 8, wherein the humidity barrier is a single-use shrink film.

11. Door according to claim 8, wherein the humidity barrier is a flat airbag, formed from foils, which has peripheral seals.

12. Door according to claim 1, wherein the inner lining has a layer structure with a voluminous, shaping support part formed from blown polypropylene beads, to which a thin padding layer formed from polyurethane flexible foam is applied, which is covered with a decorative layer made of at least one of films and fabrics and leather and is connected thereto adhering flat.

13. Door according to claim 12, wherein the voluminous support part of the inner lining has cup-shaped apertures formed therein into which the functional elements mounted on the module support protrude at least partially.

14. Door according to claim 1, wherein that module support with all the functional elements pre-assembled on it and possibly pre-tested, is connected to the inner lining to form a complete subassembly.

15. Door according to claim 1, wherein the door, formed from the door outer panel and door inner panel, is filled with module support, functional elements and at least one of inner linings of different material and structure and different interior space design.

* * * * *